United States Patent
Wigdahl et al.

(10) Patent No.: US 12,396,392 B2
(45) Date of Patent: Aug. 26, 2025

(54) CROP FEED RATE CONTROL SYSTEM FOR A HARVESTER VEHICLE

(71) Applicants: Deere & Company, Moline, IL (US); Iowa State University Research Foundation, Inc., Ames, IA (US)

(72) Inventors: Jeffrey S. Wigdahl, Ames, IA (US); Jeffrey C. Askey, Boone, IA (US); Mark A. Cracraft, Johnston, IA (US); Vasisvaran Gopal, West Des Moines, IA (US)

(73) Assignees: Deere & Company, Moline, IL (US); Iowa State University Research Foundation, Ames, IA (US)

( * ) Notice: Subject to any disclaimer, the term of this patent is extended or adjusted under 35 U.S.C. 154(b) by 761 days.

(21) Appl. No.: 17/711,384

(22) Filed: Apr. 1, 2022

(65) Prior Publication Data

US 2023/0309446 A1    Oct. 5, 2023

(51) Int. Cl.
| | |
|---|---|
| *A01D 41/127* | (2006.01) |
| *A01B 79/00* | (2006.01) |
| *G05D 1/00* | (2024.01) |

(52) U.S. Cl.
CPC ........ *A01D 41/1271* (2013.01); *A01B 79/005* (2013.01); *A01D 41/1274* (2013.01); *G05D 1/021* (2013.01)

(58) Field of Classification Search
CPC ............ A01D 41/1271; A01D 41/1274; A01D 46/14; A01B 79/005; G05D 1/021; G05B 19/04; G01M 99/007
See application file for complete search history.

(56) References Cited

U.S. PATENT DOCUMENTS

| | | | | |
|---|---|---|---|---|
| 4,458,471 | A | * 7/1984 | Herwig | A01D 41/1274 56/10.2 G |
| 9,681,605 | B2 | 6/2017 | Noonan et al. | |
| 2014/0338298 | A1* | 11/2014 | Jung | A01D 41/127 56/10.2 R |

\* cited by examiner

*Primary Examiner* — Michael C Zarroli
(74) *Attorney, Agent, or Firm* — Tucker Ellis LLP

(57) ABSTRACT

A crop feed rate control system provides crop processing data to a vehicle control system. The crop feed rate control system includes one or more feedback systems that operably provide a feedback signal including data indicative of a detected load amount for crop processing components of the crop processing system and indicative of a target load amount for the crop processing components. A first control module receives the feedback signal and generates a controlling load signal based at least upon the feedback signal, the controlling load signal being indicative of a controlling component of the crop processing components. A second control module receives a targeted load signal and the controlling load signal, the second control module operably generating crop processing data indicative of a target harvesting rate.

20 Claims, 6 Drawing Sheets

CROP FEED RATE CONTROL SYSTEM FOR A HARVESTER VEHICLE

BACKGROUND

When harvesting crops, ground speed of a crop harvester is commonly targeted at a level based on field conditions and locations of maximum crop yield. Harvesters have a defined processing capacity that is a function of ground speed and crop yield. Typically, the crop is harvested by a processing head and transported into or through the harvester where the crop may be processed at various stages. In some harvesters, the crop can be expelled from the harvester after processing.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation of a harvester vehicle, the harvest vehicle can comprise a crop processing system, which comprises two or more crop processing components that operably process a harvested crop. The harvester vehicle can further comprise a vehicle control system that operably controls a harvesting rate of the vehicle. A crop feed rate control system can operably provide crop processing data to the vehicle control system. The crop feed rate control system comprises one or more feedback systems that operably provide a feedback signal comprising data indicative of a detected load amount for the respective components of the crop processing system. The feedback signal is also indicative of a target load amount for one or more of the respective components of the crop processing system. The crop feed rate control system further comprises a first control module that operably receives the feedback signal and generates a targeted load signal and a controlling load signal based at least upon the feedback signal. The controlling load signal can be indicative of a controlling component of the two or more crop processing components of the crop processing system. A second control module operably receives a targeted load signal and the controlling load signal and generates the crop processing data indicative of a target harvesting rate for the vehicle that is different than the harvesting rate.

In another implementation, there is provided a method for controlling feed rate in a harvester vehicle having a crop processing system comprising two or more crop processing components that operably process a harvested crop and a vehicle control system to control a feed rate of the harvester vehicle by controlling the harvester vehicle speed. The method comprises controlling the feed rate in the harvester vehicle by operably providing crop processing data to the vehicle control system. The crop processing data is used by the vehicle control system to operably control the rate of harvesting for the crop harvesting device. Controlling the feed rate in the harvester vehicle comprises generating a controlling load signal based at least upon a feedback signal received from one or more feedback systems. The feedback signal comprises data indicative of a detected load amount for the respective components of the crop processing system and indicative of a target load amount for the respective components of the crop processing system. The controlling load signal is indicative of a controlling component of the two or more crop processing components of the crop processing system. Controlling the feed rate in the harvester vehicle further comprises generating the crop processing data indicative of a target harvesting rate for the vehicle that is different than the harvesting rate based at least upon a targeted load signal and controlling load signal.

In another implementation, there is provided a system for controlling a rate of harvesting of a harvester vehicle. The system comprises a crop processing system comprising two or more of the following crop processing components: a crop accumulator component that temporarily stores the harvested crop; a crop header component that operably harvests the crop from a target field; a crop conveyor component that conveys the crop through the vehicle; a crop cleaner component that operably cleans the harvested crop; a propulsion component that operably produces motion of the vehicle harvester; and a map based farming (MBF) component that guides movement of the vehicle. The system further comprises a vehicle control system that operably controls a harvesting rate of the vehicle by controlling a speed of the vehicle; and a crop feed rate control system that operably provides crop processing data to the vehicle control system, the crop processing data used by the vehicle control system to control the harvesting rate. The crop feed rate control system comprises one or more feedback systems that operably provide a feedback signal comprising data indicative of a detected load amount for the respective components of the crop processing system and indicative of a target load amount for the respective components of the crop processing system. The crop feed rate control system further comprises a first control module that operably receives the feedback signal and generates a controlling load signal based at least upon the detected load amount and the target load amount of the feedback signal, the controlling load signal indicative of a controlling component of the two or more crop processing components indicated by the component that has a greater detected load to target load ratio; and a second control module that operably receives a targeted load signal and the controlling load signal, the second control module operably generating the crop processing data indicative of a target harvesting rate for the vehicle that is different than the harvesting rate, the second control module comprising a closed-loop feedback control system, such as a proportional integrative derivative (PID) and slew rate controller, that determines a rate of change from the harvesting rate to the target harvesting rate of the vehicle based at least upon harvesting conditions.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
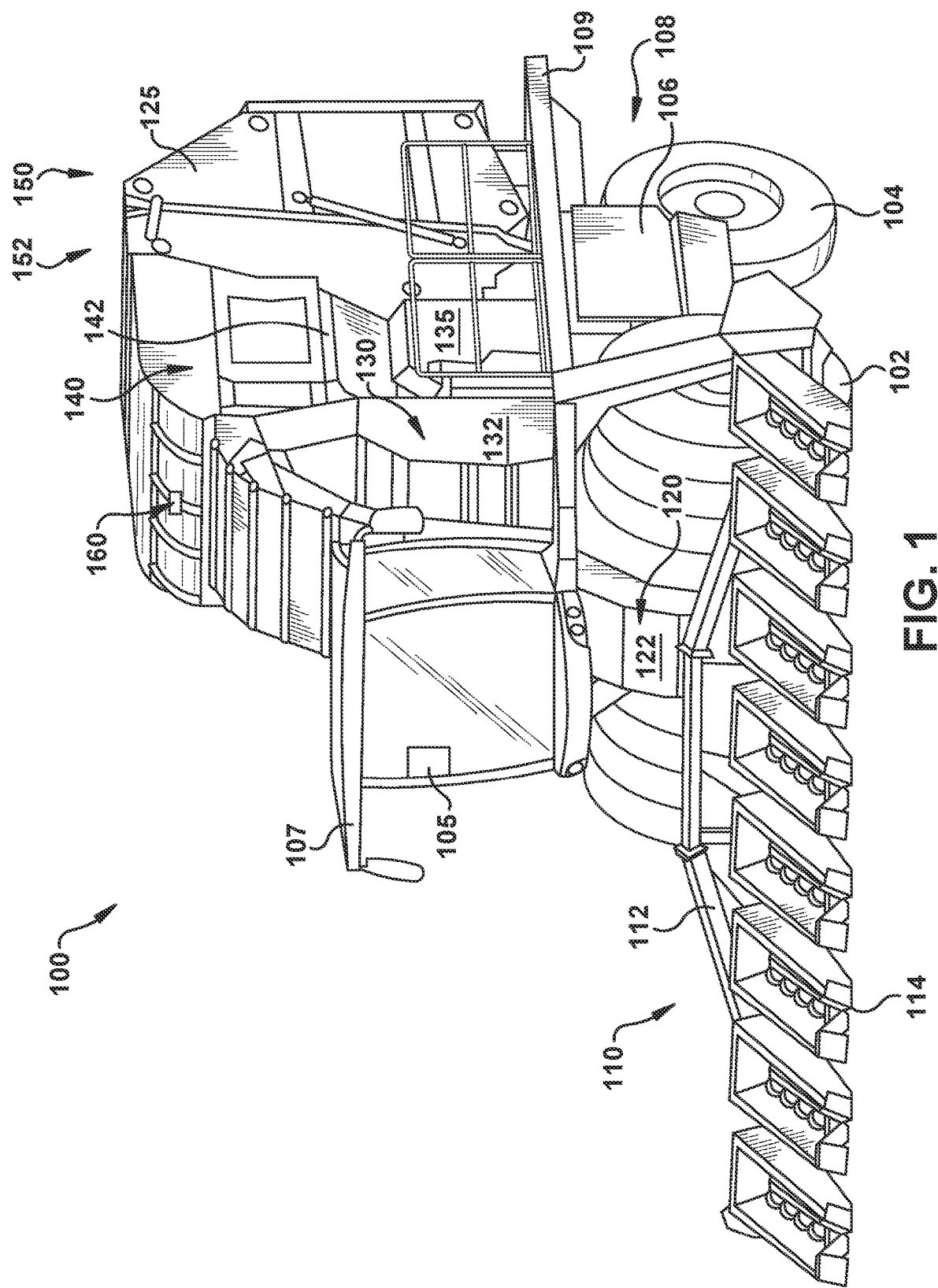
FIG. 1 is a component diagram illustrating a perspective view of a harvester according to one implementation.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

A system can be devised that improves harvesting and throughput of a crop harvested by a harvester. As an example, a crop feed rate control system can be used to dynamically control a harvesting rate (e.g., vehicle speed) of a harvester vehicle in the field based on crop conditions, targeted rates, harvester processing conditions, and in situ ground conditions, such as field conditions and ground features (e.g., topographical features). As an example, the ground features can comprise topographical features such as terraces or ruts. Controlling the harvesting rate in the harvester vehicle can comprise monitoring the crop processing components of the harvester and, based on data provided in feedback signals from the crop processing components, establishing a harvesting rate (e.g., harvester vehicle speed) that loads at least one of crop processing component to maximum desired target capacity/rate, thereby mitigating an overload of one or more portions of the harvester, resulting in a downtime event. The crop feed rate control system described herein is configured to monitor crop processing components for feedback and, based on information provided by feedback signals, determine a target harvesting rate for the harvester vehicle that is different than the current harvesting rate.

Figure 2:
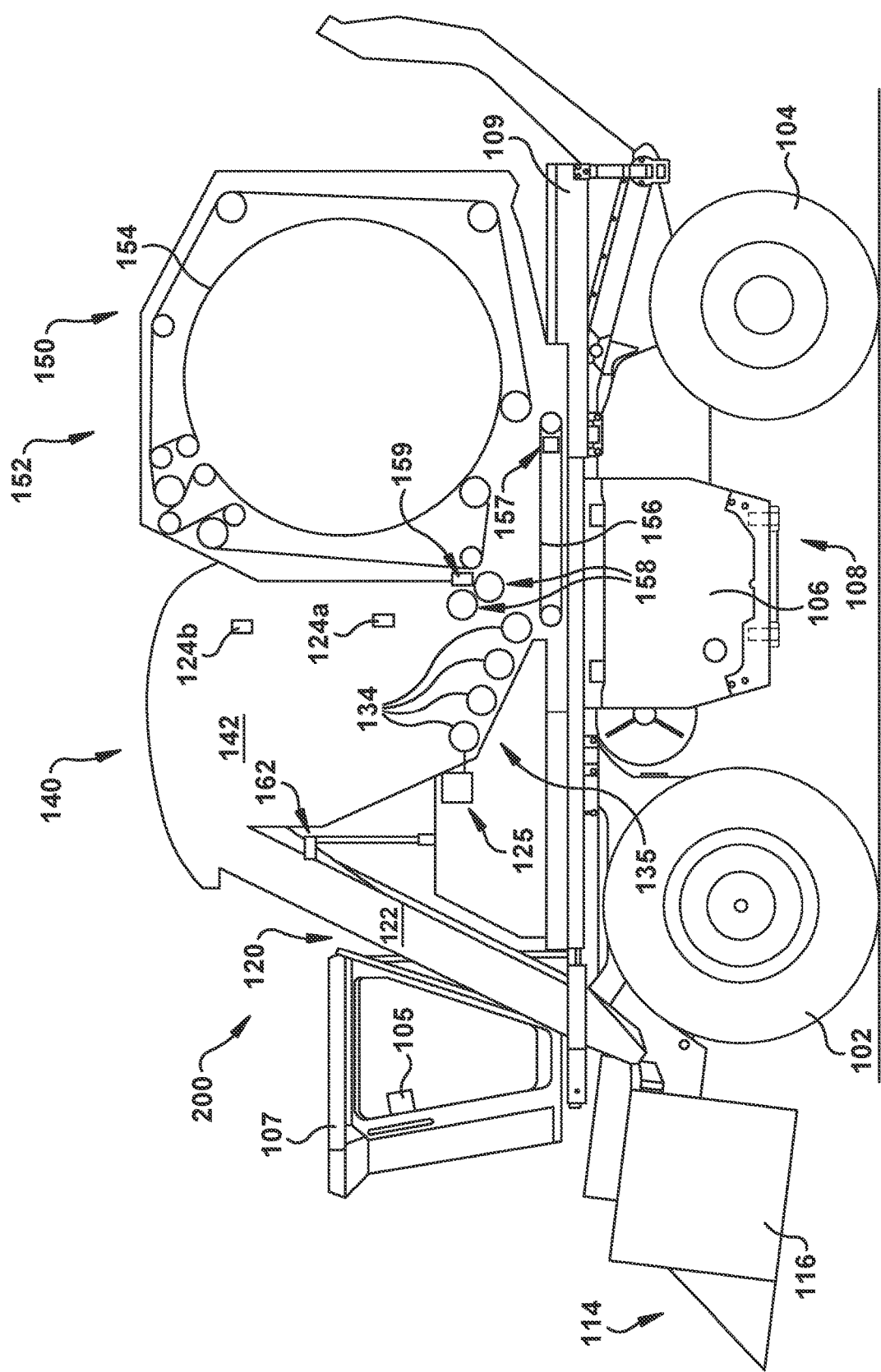
FIG. 2 is a component diagram illustrating a side view of a harvester according to another implementation.

Referring now to FIGS. 1 and 2, which each illustrate examples of a harvester vehicle 100, 200. In these examples, the harvester vehicle 100, 200 is a cotton harvester (e.g., a cotton picker 200 or a cotton stripper 100), but other types of harvesters are contemplated by this disclosure such as a combine.

The harvester vehicle 100 comprises a chassis 109 that is supported by front wheels 102 and rear wheels 104 although other support is contemplated such as tracks. The harvester vehicle 100 is adapted for movement through a field to harvest crops (e.g., cotton, corn, stover, hay, wheat, alfalfa, etc.).

An operator station 107 is supported by the chassis 109. An operator interface 105 is positioned in the operator station 107. A power module 108, such as an engine 106, can be supported below the chassis 109. Water, lubricant, and fuel tanks (not shown) may be supported in and on the chassis 109.

A crop harvesting device 114 is coupleable to the chassis 109. The crop harvesting device 114 can be configured to remove cotton from a field. The harvesting device 114 can comprise a cotton stripper header 112 (FIG. 1), one or more cotton picking units 116 (FIG. 2), or another harvesting structure (e.g., corn head, or other crop heads). Alternatively, the harvesting device 114 can be configured to remove corn, or other crops. The harvesting device 114 has different configurations (e.g., sizes, dimensions, etc.) depending on the type of crop being harvested and the manner of removing the crop from the field. In some implementations, the harvester vehicle 100 is a cotton stripper equipped with a crop harvesting device 114 that is adapted to remove, or strip, cotton (e.g., both open and unopened bolls) from the plant. In other implementations, the harvester vehicle 200 is a cotton picker equipped with a crop harvesting device 114 that is adapted to remove, or pick, the cotton from open bolls and leave the bur on the plant.

In some implementations, the harvester vehicle 100 comprises a header system 110. The header system 110 can comprise a crop header component that operably harvests a crop from a target field, a hydraulic motor or electric motor (not shown), and one or more sensors. In some implementations, the crop header component can comprise a header 112 (e.g., a cotton stripper) and a header system load monitor. It will be appreciated that some implementations of a cotton picker can comprise a header or header-equivalent feature (e.g., 116 in FIG. 2) and a header system load monitor. In these implementations, the concept and operation of a header system, for example header system 110 discussed below with respect to a cotton stripper, also generally applies to a cotton picker. But, for the purpose of brevity and for ease understanding, the disclosure provided below refers to example implementations comprising a header system 110 implemented on a cotton stripper.

For implementations of the header system 110 that comprise a hydraulic motor, a hydraulic pump on the harvester vehicle 100 can drive the hydraulic motor on the header 112. In these implementations, the hydraulic motor can supply the power to rotate a shaft that drives individual harvesting units as well as cross augers that deliver cotton to the harvester vehicle 100. In other implementations, the electric motor can supply the power to rotate a shaft that drives individual harvesting units as well as cross augers that deliver cotton to the harvester vehicle 100.

The one or more sensors can be configured to monitor, or detect, a condition that is indicative of the power output of the hydraulic pump, hydraulic motor, or electric motor that drives the header system 110. In some implementations, the sensors are configured to monitor one or more of: the hydraulic pressure at the hydraulic pump of the header system 110, the electrical current through control solenoids of the hydraulic pump in the header system 110, and the rotation speed of a shaft that drives the harvesting units in the header system 110. That is, for example, the sensors can detect a condition that is indicative of the pressure, the current, and/or the speed to monitor the crop header component. In implementations that comprise an electric motor, the sensors can detect one or more conditions related to power such as, for example, current and/or voltage. For implementations comprising a hydraulic motor or an electric motor, the sensors can detect mechanical strain of the motor driving the crop header system 110.

In some implementations, the harvester vehicle 100 comprises an air system 120. The air system 120 can comprise a crop conveyor component that conveys the crop through the harvester vehicle 100, one or more sensors 160, 162, and a crop conveyor device (e.g., one or more air ducts and an air flow generator). In some implementations, the crop conveyor component can comprise one or more air ducts 122 and an air system load monitor 452, such as an air flow load monitor.

In some implementations, the air system 120 can be operably coupled to, and in communication with, the header system 110. In these implementations, the air duct 122 is coupled to, and aligned with, the header 112 so that the cotton stripped by the header 112 can be transported into the harvester vehicle 100 (e.g., a cleaner) through the air ducts 122 of the air system 120 powered by air flow (e.g., an air generator).

The one or more sensors 160, 162 can be configured to monitor air flow and/or crop mass flow in the air ducts 122 of the air system 120. In some implementations, one or more sensors can be positioned in the air ducts 122. As an example, a harvester 100, such as a cotton stripper, may include a plurality of mass flow sensors 160, such as four cotton mass flow sensors, that are mounted across the width of the air ducts 122. In other implementations, one or more sensors can be positioned adjacent the air ducts 122. As an example, a harvester 200, such as a cotton picker, may include a plurality of mass flow sensors 162 that are mounted behind the air ducts 122 with one cotton mass flow sensor mounted per row unit. The air flow, and/or crop mass flow, can be monitored using various types of sensors such as, but not limited to, a Harvest Doc™ (HDOC) yield monitor, a vacuum sensor, an air speed sensor, etc. As an example, the HDOC yield monitor is a microwave based controller that bounces a signal off a flowing crop to detect a change in velocity with a slowing crop flow indicative of an air duct 122 being overloaded.

In some implementations, the harvester vehicle 100 comprises a cleaner system 130. The cleaner system 130 can comprise a crop cleaner component that operably cleans the harvested crop, a hydraulic motor or electric motor (not shown), and one or more sensors. In some implementations, the crop cleaner component can comprise a cleaner 132 and a cleaner system load monitor. The cleaner 132 can be provided to clean cotton from the cotton stripper header 112 by removing trash and debris. For implementations of the cleaner system 130 that comprise a hydraulic motor, a hydraulic pump on the harvester vehicle 100 can drive the hydraulic motor on the cleaner 132.

In some implementations, the cleaner system 130 can be operably coupled to, and in communication with, the air system 120 and to the header system 110, via the air system 120. In these implementations, the cleaner 132 is coupled to, and aligned with, the air duct 122 so that the cotton stripped by the header 112 can be transported into the cleaner 132 through the air ducts 122 of the air system 120 powered by air flow.

The one or more sensors can be configured to monitor, or detect, a condition that is indicative of the power output of the hydraulic pump, hydraulic motor, or electric motor that drives the cleaner system 130. In some implementations, the sensors are configured to monitor one or more of: the hydraulic pressure at the hydraulic pump of the cleaner system 130, the electrical current through control solenoids of the hydraulic pump in the cleaner system 130, and the rotation speed of a shaft of the cleaner 132 in the cleaner system 130. That is, for example, the sensors can detect a condition that is indicative of the pressure, the current, and/or the speed to monitor the crop cleaner component. In implementations that comprise an electric motor, the sensors can detect one or more conditions related to power such as, for example, current and/or voltage. For implementations comprising a hydraulic motor or an electric motor, the sensors can detect mechanical strain of the motor driving the crop cleaner system 130.

In some implementations, a crop receptacle 152 is coupleable to the air duct system 120. In some implementations, the crop receptacle 152 is a module builder 150 having at least one baler belt 154. As an example, a module builder can be used to build a module of the crop, such as a bale of cotton or hay/straw, etc. In other implementations, the crop may be ejected by the air duct system 120 into an internal hopper, and/or ejected from the harvester into an accompanying holding tank.

The harvester vehicle 100 comprises an accumulator system 140. The accumulator system 140 can comprise a crop accumulator component that operably, temporarily stores the harvest crop and one or more sensors 124. In some implementations, the crop accumulator component can comprise an accumulator 142 and an accumulator capacity monitor. The accumulator 142 is configured to receive cotton, or other crop, harvested by the cotton stripper header 112 (FIG. 1) or the cotton picking units 116 (FIG. 2).

In some implementations, the accumulator system 140 is operably coupled to, and in communication with, the cleaner system 130. In these implementations, the harvested crop can be transported (e.g., powered by air flow from an air generator) from the cleaner 132 into the top of the accumulator 142 such that the accumulator 142 fills from the bottom up.

With reference to FIG. 2, sensors 124, or feedback devices, can be coupled to the accumulator 142 to monitor an accumulator fill level and provide an accumulator fill level signal indicative of the fill level in the accumulator 142. In some implementations, the accumulator 142 has a low-level sensor 124a and a high-level sensor 124b. When the high-level sensor 124b is indicated, a signal is provided to the accumulator 142 to empty its crop contents. That is, for example, when the high-level sensor 124b detects the accumulator fill level exceeds (e.g., rises above) the pre-set sensor threshold level, an accumulator empty signal is propagated. In some implementations, the high-level sensor 124b can be configured, such as by its position in the accumulator 142, to be triggered before the accumulator 142 is completely full (e.g., having a built in buffer of extra crop accumulation space). Triggering of the low-level sensor 124a (e.g., IR sensor) indicates that the accumulator 142 has released a sufficient crop load, and should cease emptying its crop contents. That is, for example, when the low-level sensor 124a detects the accumulator fill level exceeds (e.g., drops below) a pre-set sensor threshold level, emptying of the accumulator 142 can cease. The low-level sensor 124a can be configured, such as by its position in the accumulator 142, to mitigate emptying of the crop from the accumulator 142 below a desired low level.

In some implementations, the accumulator system 140 can comprise other sensors to determine an accumulator fill rate and/or fill capacity. In some implementations, multiple sensors can be mounted at an inlet to the accumulator 142 to monitor mass flow rate (e.g., flow rate of the crop through the inlet, or other portions of the conveyor system) and accumulator fill rate. These sensors can be configured to measure the mass flow rate and to measure the time to fill the accumulator 142 between the low-level and high-level sensors 124a, 124b (e.g., accumulator fill rate) to determine yield.

In some implementations, it is beneficial to determine the mass in the accumulator 142 when the fill level is between the low-level and high-level sensors 124a, 124b. In these implementations, sensors can monitor the mass flow entering and exiting the accumulator 142 (e.g. which can be based on past accumulator cycles) and incorporate this data with additional timing data. As an example, a bale diameter can be used to determine a bale growth rate, and the bale growth rate can be used to determine the amount of mass from the size of the module diameter thereby creating a better estimation of mass in accumulator 142.

With continued reference to FIG. 2, a feeder 135 is coupleable to the chassis 109. The feeder 135 can be configured to receive cotton, or other crop, from the accumulator 142. The feeder 135 can comprise a plurality of meter rollers 134 configured to transfer the cotton, or other crop, to the module builder 150 at a feed rate. A first motor 125 is positioned to rotate the plurality of meter rollers 134. The first motor 125 may be hydraulic or electric.

A plurality of beater rollers 158 can be configured to cooperate with the plurality of meter rollers 134 to transfer the crop, such as cotton, to the module builder 150 at the feed rate. A second motor 159 can be positioned to rotate the plurality of beater rollers 158. The second motor 159 may be hydraulic or electric.

A feeder belt 156 can be configured to receive crop from the plurality of meter rollers 134 and beater rollers 158 and transfer the crop to the module builder 150 at the feed rate. A third motor 157 is positioned to rotate the feeder belt 156. The third motor 157 may be hydraulic or electric.

Figure 3:
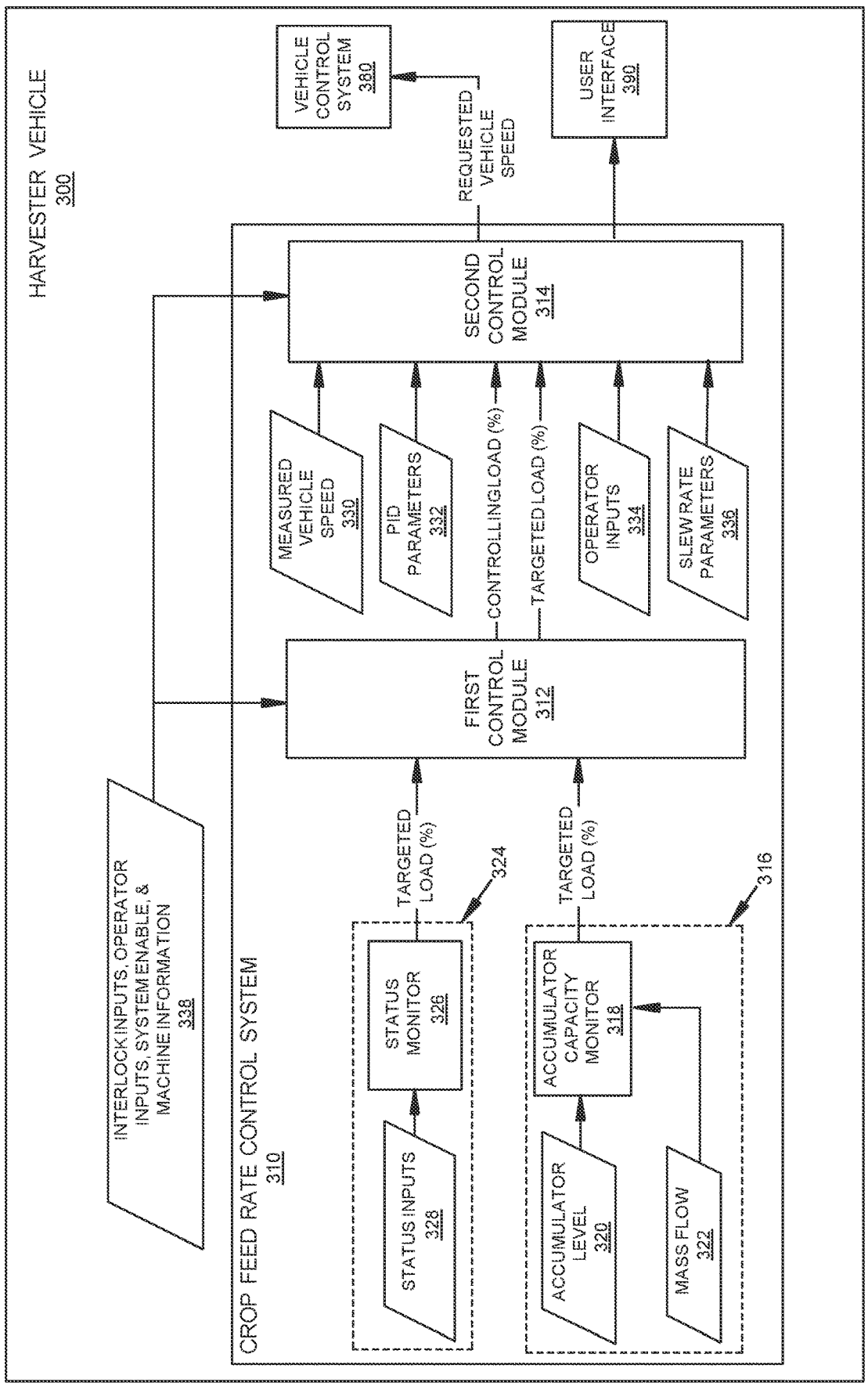
FIG. 3 is a block diagram illustrating one implementation of the harvester from FIGS. 1 and 2 comprising a crop feed rate control system in accordance with this disclosure.

FIG. 3 is a block diagram illustrating an example implementation of a harvester vehicle 300 (e.g., 100, 200 of FIGS. 1, 2 respectively) comprising a crop feed rate control system 310 in accordance with this disclosure. The crop feed rate control system 310 is operably coupled with a vehicle control system 380 of the harvester vehicle 300. The crop feed rate control system 310 operably provides crop processing data to the vehicle control system 380. The crop processing data can be used by the vehicle control system 380 to control a harvesting rate of the harvester vehicle 300.

The crop feed rate control system 310 comprises a first control module 312 operably coupled with one or more feedback systems 316, 324 of the harvester vehicle 300 and a second control module 314 operably coupled with the first control module 312. The number of feedback systems operably coupled with the first control module 312 may depend on the specifications of the harvester vehicle 300 (e.g., cotton stripper, cotton picker, combine, etc.) and the type of crop being harvested (e.g., cotton, corn, grain, etc.).

In some implementations, one or more feedback devices, such as sensors, can be configured to monitor, or detect, crop processing data (e.g., accumulator level 320, machine mass flow 322, etc.) associated with crop processing components (e.g., a crop accumulator component, a crop header component, a crop conveyor component, a crop cleaner component, etc.) of the harvester vehicle's crop processing system. In some implementations, the data can be indicative of a detected load amount for the respective components of the crop processing system. The one or more feedback devices can be operably coupled with a respective load monitor (e.g., 318 and 326) of a respective feedback system. The load monitor can be configured to generate a feedback signal (e.g., load signal) based at least upon the data detected by the feedback devices.

In some implementations, the load monitor can comprise a controller, such as a microcontroller. In these implementations, the load monitor can comprise a processor, a memory device operably coupled with the processor, and logic (e.g., programmable logic) stored in the memory device, the logic configured to generate a feedback signal. In some implementations, the feedback device and the load monitor are independent, separate components. In other implementations, the feedback device and the monitor are integrated in a single unit.

The crop feed rate control system 310 comprises one or more feedback systems 316, 324 that operably provide a feedback signal comprising data indicative of a detected load amount for the respective crop processing components of the crop processing system and indicative of a target load amount for one or more of the respective crop processing components of the crop processing system.

In some implementations, a feedback system 316 comprises a crop accumulator component comprising an accumulator capacity monitor 318. In some implementations, the accumulator capacity monitor 318 operably receives (i) an accumulator level signal indicative of a detected fill level (%) in the accumulator 320 and (ii) a mass flow rate signal indicative of a detected mass flow 322 of crop in the accumulator, and generates an accumulator feedback signal comprising data indicative of the targeted load amount for the crop accumulator component.

The targeted load amount, or targeted load (%), can be set to a value that correspondingly sets (i.e., controls) the system capacity of a respective feedback system. Hence, the targeted load (%) can also be referred to as feedback system capacity. In some implementations, the targeted load (%) is set to maximize the harvesting rate and, by extension, maximize the productivity/throughput. As an example, the targeted load (%) can be set to 100% (e.g., to full capacity) to maximize the harvesting rate. In various implementations, the targeted load (%) can be set in excess of 100% (e.g., full capacity) such as, for example, 120%. In some implementations, the targeted load (%) can be set at less than full capacity (e.g., the targeted load (%) is set to 70%). In some implementations, the targeted load (%) for a particular feedback system can be set to regulate harvester operation to a certain ground speed and to empty the accumulator at a designated rate. Generally, the targeted load (%) is set at a value less than or equal to the maximum harvester feedback system capacity so as not to exceed the machine operating limitations for a particular feedback system by the operator, by the machine, or by a factory setting.

In some implementations, the targeted load (%) can be set manually. As an example, an operator can manually input (i.e., manually set) the targeted load (%) to set the system capacity of a respective feedback system. In some implementations, the targeted load (%) can be set manually or set to a default setting. As an example, the targeted load (%) can be a factory setting in which the targeted load (%) is based on a factory preset (e.g., a default setting).

In some implementations, the accumulator level data 320 (e.g., or accumulator fill level) can be provided by one or more feedback devices, or sensors, that are coupled to the accumulator (e.g., high-level and low-level sensors). The feedback devices can be configured to monitor the accumulator fill level and provide an accumulator fill level signal indicative of the detected accumulator fill level 320. As an example, monitoring the accumulator fill level can be beneficial to mitigate overfilling the accumulator, which can result in downtime. In some implementations, if the accumulator fill level 320 indicates the accumulator is approximately full, the harvester vehicle 300 can automatically slow down to avoid overflow and can activate a wrap and eject cycle in the harvester vehicle 300 (e.g., a cotton harvester).

In some implementations, the mass flow data 322 can be provided by multiple feedback devices, or sensors, such as the mass flow sensors 160 in FIG. 1 or 162 in FIG. 2. In some implementations, mass flow sensors can be mounted at an inlet to the accumulator to monitor mass flow rate and accumulator fill rate. In some implementations, the feedback devices can be configured to measure the mass flow rate and the time to fill the accumulator between low-level and high-level sensors (e.g., accumulator fill rate) in order to determine yield.

In some implementations, the accumulator capacity monitor 318 can determine the available capacity in the accumulator for additional mass (e.g., more crop) by coupling the data indicative of the detected accumulator level 320 with the data indicative of the measured mass flow 322 of crop in the accumulator.

In other implementations, the accumulator capacity monitor 318 operably receives (i) an accumulator level signal indicative of a detected fill level (%) in the accumulator 320 and (ii) a mass flow rate signal indicative of a detected mass flow 322 of crop in the accumulator, and generates a load capacity feedback signal rather than a target load (%).

In some implementations, a feedback system 324 comprises a status monitoring component comprising a status monitor 326. In these implementations, the status monitor 326 operably receives a detected component load signal (e.g., status inputs 328) from respective crop processing components of the crop processing system and generates a feedback signal based at least on a load capacity of the respective crop processing components and the detected component load. In some implementations, the generated feedback signal comprises data indicative of the detected load amount for the respective crop processing components of the crop processing system. In some implementations, the status monitoring component actively updates a load capacity of the respective crop processing components of the crop processing system during operation, based at least on active calibration of an empty load condition.

In some implementations, the status monitor 326 can comprise a fault monitor. The fault monitor can indicate the crop processing status (e.g., status flag, fault signal, stop error, etc.) of crop processing components in the harvester vehicle 300. In some implementations, the fault monitor is a diagnostic trouble code (DTC) monitor that receives DTC inputs (e.g., primarily related to shaft speeds and states).

In some implementations, the fault monitor can set a target load amount to zero when a speed sensor indicates a fault resulting in a reduction of the harvesting rate. As an example, blockage of the high-level sensor in the accumulator (e.g. indicating the accumulator is overfilling) can trigger a fault signal (e.g., as input) to the fault monitor to change the target load from its current position to zero (e.g. 0%) to stop motion of the harvester vehicle 300. Setting the target load to zero (e.g. 0%) instructs the harvester vehicle 300 to stop because the speed sensor indicates a fault condition. As another example, in a cotton stripper, several fault signals can appear due to a row unit slip, cross auger slip, shaft slips on the cleaner, etc., which can trigger a fault signal to the fault monitor to change the target load from its current position to zero (e.g. 0%) to stop motion of the harvester vehicle 300.

In some implementations, the first control module 312 operably receives the feedback signal and generates a controlling load signal based at least upon the feedback signal that the one or more feedback systems operably provide. The controlling load signal, or controlling load (%), can also be referred to as measured machine harvest capacity. The measured machine harvest capacity, or controlling load (%), may indicate what feedback system or component is limiting (or will limit) the harvesting rate of the harvester. In some implementations, the controlling load signal is indicative of a controlling component of two or more crop processing components of the crop processing system. As an example, the controlling load signal can indicate the harvester vehicle load at the current operating condition (e.g., harvesting rate). As another example, if the load of one feedback system is the dominant load (higher load) currently dictating capacity, then the harvester can control to this load. In this manner, multiple feedback systems can provide input that is processed and reduced to one controlling load (%) value.

In some implementations, the first control module 312 generates a targeted load signal based at least upon the feedback signal that the one or more feedback systems operably provide. In these implementations, the targeted load signal indicates the harvester vehicle load for the desired operating condition (e.g., target harvesting rate). The targeted load signal can depend on operator settings and ground conditions (e.g., crop density, moisture, etc.). In some implementations, the targeted load signal, or targeted load (%), can be set by the operator to set the machine harvest capacity of the harvester. Hence, the targeted load (%) can also be referred to as set machine harvest capacity. Typically the operator sets the targeted load (%) at a value less than or equal to the maximum machine harvest capacity so as not to exceed the machine operating limitations. In most instances, the operator sets the targeted load (%) to 100% to maximize the harvesting rate, but the operator can set the harvester to run at less than 100%.

In some implementations, the first control module 312 can comprise a controller. The controller can comprise a processor, a memory device operably coupled with the processor, and logic (e.g., programmable logic) stored in the memory device, the logic configured to generate the controlling load signal and the targeted load signal based at least upon the feedback signal. In some implementations, the first control module 312 can comprise logic (e.g., programmable logic) that is stored either on a control device of the crop feed rate control system 310 or on another control unit in the harvester vehicle 300. The logic can be configured to generate a targeted load signal and a controlling load signal based at least upon the feedback signal.

In some implementations, the first control module 312 comprises a core system control module that determines the controlling component based at least upon the detected load amount and the target load amount. In some of these implementations, the controlling component is indicated by the crop processing component having a greater detected load to target load ratio.

As an example, the first control module 312 can be configured to determine based at least upon the feedback signals which respective crop processing component (or respective crop processing components in the event multiple crop process components are the most limiting to an equivalent extent) will have the most limiting effect on the harvesting rate (i.e., by slowing the harvesting rate and reducing throughput). The first control module 312, by generating a controlling load signal indicative of a controlling component, can help the crop feed rate control system 310 establish a harvesting rate that loads the controlling component to near its maximum throughput (e.g., optimizing the load), while at the same time mitigating overload of the controlling component, which can result in downtime.

In some implementations, the second control module 314 operably receives a targeted load signal and the controlling load signal. The second control module 314 operably generates the crop processing data indicative of a target harvesting rate for the harvester vehicle 300 that is different than the harvesting rate.

In some implementations, the second control module 314 can comprise a controller. The controller can comprise a processor, a memory device operably coupled with the processor, and logic (e.g., programmable logic) stored in the memory device, the logic configured to generate the crop processing data indicative of a target harvesting rate for the harvester vehicle 300. In some implementations, the second control module 314 can comprise logic (e.g., programmable logic) stored on either a control device of the crop feed rate control system 310 or on another control unit in the harvester vehicle 300. The logic can be configured to generate the crop processing data indicative of the target harvesting rate for the harvester vehicle 300 that is different than the present harvesting rate.

In some implementations, the second control module 314 comprises a closed loop feedback controller. As an example, the closed loop feedback controller can comprise a proportional integrative derivative (PID) controller or a model predictive control (MPC), but is not so limited.

In some implementations, the second control module 314 comprises a closed-loop feedback controller in the form of a PID and slew rate controller. In these implementations, the PID and slew rate controller can use predetermined parameters to identify the target harvesting rate for the harvester vehicle 300 based at least on a difference between the controlling load and the target load for the controlling component, and determines a rate of change from the harvesting rate to the target harvesting rate of the harvester vehicle 300 based at least upon harvesting conditions.

The PID and slew rate controller provides for closed loop control. In some implementations, the closed loop control applies to all the crop systems of the feed rate control system 310 (e.g., normalizing all the systems). In some implementations, the PID and slew rate controller can limit the rate of increase/decrease of the harvesting rate (e.g., limits the rate of increase/decrease in vehicle speed) to provide a smooth, comfortable ride for the operator (e.g., not abrupt and jerky).

In some implementations, the second control module 314 receives one or more of the following, to be used by the PID and slew rate controller to identify the target harvesting rate and the rate of change from the harvesting rate to the target harvesting rate: an operably measured harvester vehicle speed 330; one or more predetermined PID parameters 332; one or more operator inputs 334; and one or more predetermined slew rate parameters 336. In these implementations, the measured harvester vehicle speed 330 refers to a measured ground speed.

In some implementations, the PID and slew rate controller corrects for error that is calculated as the difference between the controlling load and the targeted load. As an example, if the difference between the controlling load and the targeted load is within ±3 percent, the harvester vehicle 300 enters a holding pattern during which time the harvesting rate of the harvester vehicle 300 (e.g., the harvester vehicle speed) remains constant.

In this implementation, the crop feed rate control system 310 is operably coupled to the vehicle control system 380. The vehicle control system 380 operably controls a harvesting rate of the harvester vehicle 300 such as, for example, by adjusting the ground speed of the harvester vehicle 300. The crop feed rate control system 310 controls a feed rate in the harvester vehicle 300 by operably providing crop processing data to the vehicle control system 380 that can be used by the vehicle control system 380 to control the harvesting rate of the harvester vehicle 300.

In some implementations, the crop feed rate control system 310 can be operably coupled with a user interface 390. The user interface 390 can be configured to display information about the status of the crop feed rate control system 310. In some implementations, the user interface 390 can be an interactive display. The operator can review the vehicle speed signal provided by the second control module 314 to the vehicle control system 380 and can manually override the suggested vehicle speed to prevent the automatic adjustment of the harvesting rate.

In some implementations, the first control module 312 and/or the second control module 314 may further receive one or more of interlock inputs and operator inputs, collectively at 338. The interlock inputs comprise events that enable the crop feed rate control system 310 such as, for example, the system is on, in a harvesting state, and in the act of harvesting material. The operator inputs may permit an operator to enter desired operating parameters (e.g., user input) within a bounded, predetermined range (e.g., programmed into the system). As an example, the operator can set target load values for any of the crop processing components in the crop processing system and/or the ground speed.

In one practical application, the crop feed rate control system 310 can be used to determine the wrap-eject cycle of a cotton harvester based on the timing of the last cycle, the accumulator fill level and fill rate, and the current mass flow rate. For example, assume the wrap-eject cycle cannot be initiated for 30 seconds, but the accumulator will be full at the current mass flow rate in 20 seconds. Then, the crop feed rate control system 310 can scale back, or reduce, the target load amount (e.g., as a function of accumulator fill level and mass flow rate), which in turn results in a reduction of the harvesting rate of the harvester vehicle (e.g. reduction in vehicle speed). In this manner, the accumulator becomes full at approximately the same time the wrap-eject cycle is completed.

Figure 4:
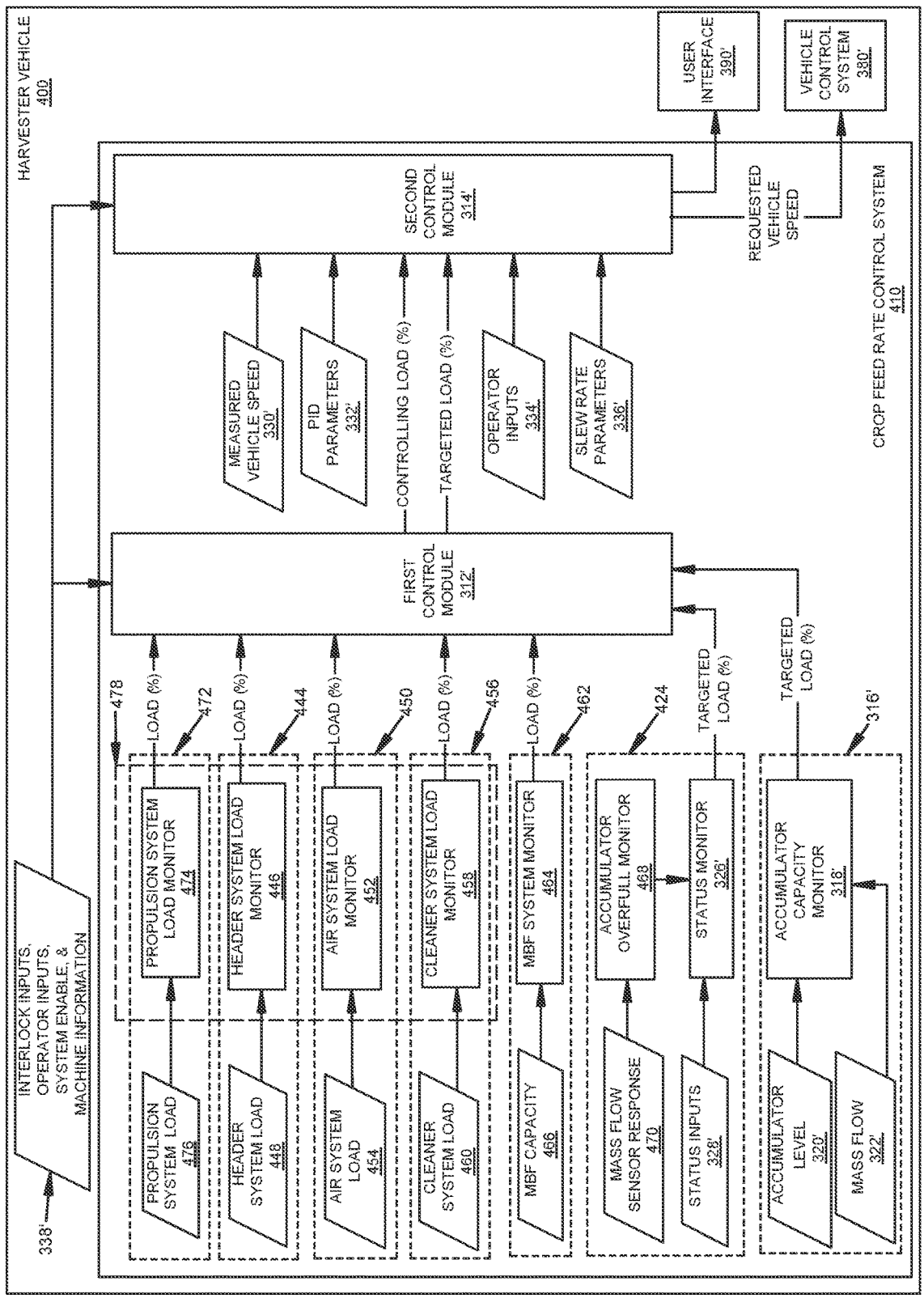
FIG. 4 is a block diagram illustrating another implementation of a harvester vehicle, such as that shown in FIGS. 1 and 2, comprising a crop feed rate control system in accordance with this disclosure.

FIG. 4 is a block diagram illustrating another example implementation of a harvester vehicle 400 (e.g., 100 of FIG. 1 and 200 of FIG. 2) comprising a crop feed rate control system 410 in accordance with this disclosure. It will be appreciated that the crop feed rate control system 410 of harvester vehicle 400 is generally applicable to both a cotton stripper and a cotton picker except for the cleaner-related elements (e.g., 456, 458, 460 in FIG. 4). Implementations of a cotton stripper can comprise a cleaner and, by extension, a cleaner feedback system (e.g., 456 in FIG. 4), while a cotton picker does not include a cleaner. Therefore, implementations of a cotton picker can comprise all the elements of the crop feed rate control system 410 of harvester vehicle 400, except for the cleaner feedback system 456 and its associated elements (e.g., 458, 460 of FIG. 4). Elements common to the crop feed rate control system 400 of FIG. 4 and 300 of FIG. 3 that are substantially similar and operate substantially the same way are represented by a (') and are generally omitted from discussion for the purpose of brevity.

In this implementation, the harvester vehicle 400 comprises a crop processing system 410 comprising two or more crop processing components that operably process a harvested crop. In some implementations, the two or more crop processing components comprise at least two of: a crop accumulator component that operably, temporarily stores the harvested crop; a crop header component that operably harvests the crop from a target field; a crop conveyor component that conveys the crop through the harvester vehicle 400; a crop cleaner component that operably cleans the harvested crop; a propulsion component that operably produces motion (e.g., drives) the harvester vehicle 400; and a map based farming (MBF) component that operably guides movement of the harvester vehicle 400 during harvesting.

In some implementations, a feedback system 444 comprises a crop header component comprising a header (e.g., 112 of FIG. 1) and a header system load monitor 446. In these implementations, the header system load monitor 446 operably receives an in-operation header load signal (e.g., real-time load) indicative of a detected load at the header, and generates a load capacity feedback signal. As an example, the header load signal can comprise a measured pressure (kPa), speed (rpm), and/or current that may represent a real-time load. In some implementations, the load capacity feedback signal can comprise data indicative of the detected load amount for the header component from one or more of: detected pressure at a header pressure pump; detected electrical current through control solenoids of the pump in the header system; and a detected shaft rotation speed in the header. In some implementations, the load capacity feedback signal can comprise data indicative of the detected load amount for the header component as a function of power such as current, voltage, and/or the torque/strain of the motor driving the header. It will be appreciated that the concept of a header component and monitoring a header system load applies to cotton stripper implementations and cotton picker implementations.

The load (%), or load signal, can be referred to as measured feedback system capacity. The load (%), or measured feedback system capacity, is the actual load that each system is running at and, because machines are generally configured to run at maximum capacity, load (%) generally represents the maximum crop throughput for a particular feedback system under a given set of conditions (e.g., each harvester has machine-based limitations). Thus, the measured feedback system capacity can be considered a maximum feedback system capacity in some scenarios. The maximum feedback system capacity can be operator selectable or preselected (e.g., a factory setting) based on machine characteristics at factory, at the beginning of a season, daily for a particular field, updated based on machine age, maintenance schedule, etc. In some implementations, the maximum feedback system capacity that is used within each feedback system is kept independent, separate, and distinct from other systems or modules. In other implementations, the maximum feedback system capacity that is used within each feedback system can be passed to (e.g., shared with) other systems or modules rather than being kept separate and distinct. The measured feedback system capacity can also vary depending on crop conditions (e.g., wet versus dry crop) and ground conditions.

The ground conditions that affect the measured feedback system capacity include field conditions and ground features. The field conditions can comprise soil conditions such as, for example, muddiness as well as the row sensing accuracy and guidance. The ground features are topographical features and can comprise terraces and ruts. The ground conditions can impact the harvesting limits of the harvester vehicle 400 resulting in decreased harvesting efficiency and harvest quality.

In some implementations, the crop header component comprises a hydraulic system and the hydraulic pressure is measured at a hydraulic pump. In some implementations, the shaft rotation speed is detected using a hall-effect pickup sensor disposed on the header. In some implementations, a gear tooth pick up sensor may indicate the actual measured speed of the shaft (rpm).

In some implementations, the header system load monitor 446 can comprise a header load capacity algorithm configured to process the header load signal and generate the load capacity feedback signal. In these implementations, the header system load capacity algorithm outputs a load capacity feedback signal that is a normalized load for the header system (e.g., 0 to 100% providing some indication of header load system capacity).

In some implementations, the detected header load input 448 can be a combination of pressure and speed. In these implementations, the header system load monitor 446 can use the header load capacity algorithm to process the detected header load signal comprising the combined pressure and speed. In other implementations, the detected header load input 448 can be a combination of pressure and current. In these implementations, the header system load monitor 446 can use the header load capacity algorithm to process the detected header load signal comprising the combination of pressure and current. In yet other implementations, the detected header load input 448 can be a combination of voltage and current as a function of power. Generating a load capacity feedback signal comprising the combination of data (e.g., pressure and speed, pressure and current, voltage and current, etc.) indicative of the detected load amount 448 for the header component can make the header system more robust.

In some implementations, a feedback system 450 comprises a crop conveyor component comprising one or more air ducts (e.g., 122 in FIG. 1) and an air system load monitor 452, such as an air flow load monitor. In these implementations, the air system load monitor 452 operably receives an air flow signal 454 indicative of air flow in the one or more ducts, and generates a load capacity feedback signal comprising data indicative of the detected load amount for the air flow through the air ducts 122. In some implementations, the air system load monitor 452 can comprise an air flow load capacity algorithm configured to process the air flow signal and generate the load capacity feedback signal.

In some implementations, a feedback system 456 comprises a crop cleaner component comprising a cleaner (e.g., 132 in FIG. 1) and a cleaner system load monitor 458. In these implementations, the cleaner system load monitor 458 operably receives an in-operation cleaner load signal indicative of a detected load 460 at the cleaner, and generates a load capacity feedback signal. As an example, the cleaner load signal can comprise a measured pressure (kPa), speed (rpm), and/or current that may represent a real-time load. The load capacity feedback signal can comprise data indicative of the detected load amount 460 for the cleaner component from one or more of: a detected pressure at a pump in the cleaner system; a detected electrical current through control solenoids of the pump in the cleaner system; and a detected shaft rotation speed. In some implementations, the load capacity feedback signal can comprise data indicative of the detected load amount for the cleaner component as a function of power such as current, voltage, and/or the torque/strain of the motor driving the cleaner.

In some implementations, the crop cleaner component comprises a hydraulic system and the hydraulic pressure is measured at a hydraulic pump. In some implementations, the shaft rotation speed is detected using a hall-effect pickup sensor disposed on the cleaner. In some implementations, a gear tooth pick up sensor may indicate the actual measured speed of the shaft in rpm.

In some implementations, the cleaner system load monitor 458 can comprise a cleaner system load capacity algorithm to process the detected cleaner load signal and generate the load capacity feedback signal. In these implementations, the cleaner system load capacity algorithm outputs a load capacity feedback signal that is a normalized load for the cleaner system (e.g., 0 to 100% providing some indication of cleaner system load capacity).

In some implementations, the detected cleaner load input can be a combination of pressure and speed. In these implementations, the cleaner system load monitor 458 can use the cleaner load capacity algorithm to process the detected cleaner load signal 460 comprising the combined pressure and speed load input. In other implementations, the detected cleaner load input can be a combination of pressure and current. In these implementations, the cleaner system load monitor 458 can use the cleaner load capacity algorithm to process the detected cleaner load signal comprising the combination of pressure and current. In yet other implementations, the detected cleaner load input 448 can be a combination of voltage and current as a function of power. Generating a load capacity feedback signal comprising the combination of data (e.g., pressure and speed, pressure and current, etc.) indicative of the detected load amount for the cleaner component 456 can make the cleaner system more robust.

In one aspect, the header and cleaner systems are treated very similar with respect to the load capacity algorithms. As an example, the respective load capacity algorithms set the upper threshold for load capacity based on field testing. Additionally, both the header system and cleaner system can use a machine calibration for determining the normal expected load on the systems due to friction, motor losses, etc. As an example, both the header system load monitor 446 and capacity algorithm and the cleaner system load monitor 458 and capacity algorithm can actively monitor the system for calibration of empty load conditions. Incorporating calibration into the system 444, 456 improves performance of the crop feed rate control system 410 by identifying the normal expected load on the systems when there is no crop flow through the header and cleaner.

In some implementations, a feedback system 472 comprises a propulsion component comprising at least one propulsion/drive circuit, a propulsion device (e.g., a motor or engine that produces motion), and a propulsion system load monitor 474. In these implementations, the propulsion system load monitor 474 operably receives an in-operation propulsion load signal indicative of a detected load 476 at the propulsion circuit and/or propulsion device, and generates a load capacity feedback signal. As an example, the propulsion load signal can comprise a measured pressure (kPa), speed (rpm), current, and/or power that may represent a real-time load. The load capacity feedback signal can comprise data indicative of the detected load amount 476 for the propulsion component from one or more of: a detected pressure of the propulsion circuit; a detected power output of the propulsion device (e.g., motor or engine); and a detected electrical current through the propulsion device. In some implementations, the load capacity feedback signal can comprise data indicative of the detected load amount for the propulsion component as a function of power such as current, voltage, and/or the torque/strain of the motor/engine driving the harvester vehicle 400.

In some implementations, the propulsion system load monitor 474 can comprise a propulsion system load capacity algorithm to process the detected propulsion load signal and generate the load capacity feedback signal. In these implementations, the propulsion system load capacity algorithm outputs a load capacity feedback signal that is a normalized load for the propulsion system (e.g., 0 to 100% providing some indication of propulsion system load capacity). In these implementations, the propulsion system load monitor 474 can use the propulsion load capacity algorithm to process the detected propulsion load signal 476. In some implementations, the propulsion feedback system 472 can generate a load capacity feedback signal comprising a combination of data (e.g., pressure and speed, pressure and current, etc.) indicative of the detected load amount for the propulsion component that can make the propulsion feedback system 472 more robust.

In another aspect, feedback systems 444, 450, 456, and 472, collectively at 478, may all have respective monitors comprising respective load capacity algorithms configured to convert system loading to a capacity during real-time operation. Moreover, feedback systems 478 may actively monitor systems for calibration of empty load conditions.

In some implementations, a feedback system 462 comprises a map based farming (MBF) component comprising an MBF system monitor 464. In these implementations, the MBF system monitor 464 operably receives a MBF signal indicative of a detected MBF load and generates a load capacity feedback signal. The load capacity feedback signal can comprise data indicative of a detected MBF load amount of capacity speed, based at least upon imaging that correlates a crop to a projected yield. As an example, MBF monitor 464 can use imagery, such as aerial imagery from satellites and/or commercial drones, to observe the crop and correlate that to a yield. In some implementations, the MBF component can use thermal imaging, for example in the near-infrared (NIR) wavelength range, during the farming season to determine crop yield in advance. In some implementations, the MBF component can use data from one or more of a look-ahead camera, light detection and ranging (LIDAR) technology, and millimeter-wave (mmWave) radar technology to estimate the crop yield while harvesting. The MBF component can be very beneficial for handling abrupt changes in yield in a field.

In some implementations, a feedback system 424 comprises a status monitoring component comprising a status monitor 326' that operably receives a detected component load signal from respective components of the crop processing system and generates a feedback signal based at least on a load capacity of the respective components and the detected component load. The feedback signal can comprise data indicative of the detected load amount for the respective crop processing components of the crop processing system. In some implementations, the feedback system 424 comprises an accumulator overfull monitor 468 that operably receives a mass flow sensor response signal 470 and generates a feedback signal. The feedback signal can comprise data indicative of a detected overfill condition in the accumulator of the crop processing system, resulting in the status monitor 326' indicating a fault that reduces the harvesting rate and/or stops the harvester vehicle 400. In some implementations, the status monitoring component actively updates a load capacity of the respective components of the crop processing system during operation, based at least on active calibration of an empty load condition.

In some implementations, the mass flow sensor response 470 is a raw signal (e.g., unprocessed). In other implementations, the mass flow sensor response 470 is a conditioned signal. The crop feed rate control system 410 treats the raw signal and the conditioned signal (e.g., a processed signal upon which algorithms have been applied) the same, but there is generally greater confidence in the conditioned signal.

In some implementations, the first control module 312' and/or the second control module 314' may further receive one or more of interlock inputs and operator inputs, collectively at 338'. The interlock inputs comprise events that enable the crop feed rate control system 410 such as, for example, the system is on, in a harvesting state, and in the act of harvesting material. The operator inputs may permit an operator to enter desired operating parameters (e.g., user input) within a bounded, predetermined range (e.g., programmed into the system). As an example, the operator can set target loads for crop processing components in the crop processing system such as, for example, the operator setting the header at 95% but the cleaner at 100%.

Throughput and, by extension, the available capacity of each crop processing component in the crop processing system can be affected by crop conditions (e.g., density, moisture, etc.) and/or ground conditions to unequal extents. By automatically generating a controlling load signal indicative of a controlling component, the crop feed rate control system 410 can beneficially maximize utilization of available capacity in the controlling crop processing component.

The ground conditions can impact the harvesting limits of the harvester vehicle 400 resulting in decreased harvesting efficiency and quality. As an example, an extremely muddy field may cause the harvester vehicle to slip and slide across the field resulting in inaccurate row guidance (e.g., row sensing GPS) due to slipping and increased power usage by the propulsion component in an effort gain traction and drive. With increased power utilization by the propulsion device, there is less remaining power to drive other crop processing components on the harvester vehicle. As a result, the crop feed rate control system 410 can reduce feed rate in order to mitigate and/or avoid overloading another crop processing component operating with less supplied power. Additionally, the crop feed rate control system 410 can be configured to recognize that am increase in power consumption by the propulsion component may indicate the presence of non-optimal ground conditions that can affect the crop feed rate. In this example, the propulsion component is the controlling crop processing component and the controlling load signal is based at least upon data indicative of the detected load amount for the propulsion component.

Thus, it will be appreciated that as ground conditions worsen, the ground speed of the harvester vehicle 400 may need to be reduced. In these scenarios, the ground speed of the harvester vehicle 400 can be reduced via the crop feed rate control system 410.

Figure 5:
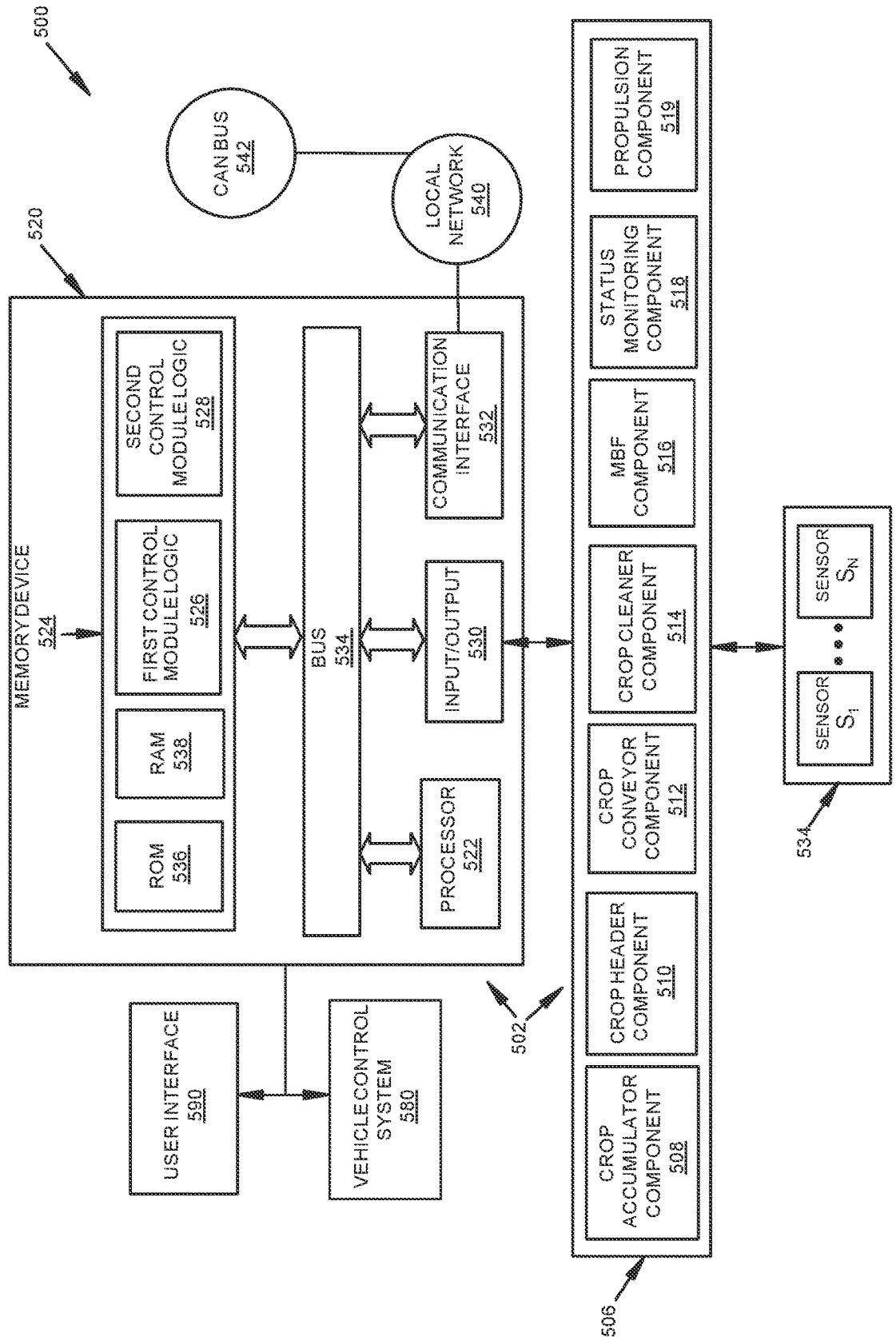
FIG. 5 is a schematic diagram illustrating an example implementation of a system for controlling a rate of harvesting of a harvester vehicle in accordance with this disclosure.

FIG. 5 is a schematic diagram illustrating an example implementation of a system 500 for controlling a rate of harvesting of a harvester vehicle (e.g., 300, 400 in FIGS. 3 and 4 respectively). The system 500 comprises a crop feed rate control system 502 for a harvester vehicle in which the first control module, configured as first control module logic 526, and the second control module, configured as second control module logic 528, are integrated into a control device 520. The control device 520, such as a programmable controller, is operably coupled with one or more feedback systems 506 each comprising a crop processing component (e.g., 508, 510, 512, 514, 516, 518, and 519). The control device 520 is also operably coupled with a vehicle control system 580.

In some implementations, the one or more feedback devices, or sensors Si—SN, monitor data (e.g., accumulator level, machine mass flow, etc.) associated with crop processing components (e.g., 508, 510, 512, 514, 516, 518, and 519) of the crop processing system. The one or more sensors Si—SN can be configured to generate a signal representative of the monitored data indicative of a detected load associated with the respective crop processing component. The detected component data is used by the feedback systems 506 to provide the feedback signals. In some implementations, the one or more sensors Si—SN can be located on the crop processing component such as, for example, the header, cleaner, or accumulator. In some implementations, the one or more sensors Si—SN may be included in a sensor bank 534.

In some implementations, the control device 520 comprises a processor 522, a memory device 524 operably coupled with the processor 522, and first and second control module logic 526, 528 stored in the memory device 524. The control device 520 (e.g., a programmable controller) can comprise an input/output 530 for receiving, as input, the feedback signals from the one or more feedback systems (collectively at 506) and for providing, as output, crop processing data indicative of a target harvesting rate (e.g., a vehicle speed command) for the harvester vehicle. In some implementations, the control device 520 can be programmed to automatically provide crop processing data indicative of the target harvesting rate (e.g., a vehicle speed command) to the vehicle control system 580.

In some implementations, the control device 520 can comprise a bus 534 or other communication mechanism for communicating information (e.g., operator inputs, measured vehicle speed, PID and slew rate parameters) and a processor 522 coupled with the bus 534 for processing information. The control device 520 comprises a memory device 524 (e.g., main memory), which may comprise random access memory (RAM) 538 or other dynamic storage devices for storing information and instructions (e.g., first and second control module logic 526, 528) to be executed by the processor 522, and read only memory (ROM) 536 or other static storage device for storing static information and instructions for the processor 522. The main memory 524 may be a non-volatile memory device and operable to store information and instructions executable by the processor 522.

The crop feed rate control system 502 can comprise any type of sensor capable of monitoring data (e.g., accumulator level, machine mass flow, etc.) associated with crop processing components of the crop processing system. A non-limiting list of the types of sensors Si—SN that may be utilized in the crop feed rate control system 502 include: pressure sensors, current sensors, component speed sensors, vehicle speed sensors, HDOC yield sensors, air speed sensors, vacuum sensors, moisture sensors, weight sensors, IR sensors, and mass flow sensors.

In some implementations, the control device 520 can be operably coupled with a user interface 590. In some implementations, the user interface 590 can be configured to display information about the status of the crop feed rate control system 502.

In some implementations, the control device 502 and, in particular a communication interface 532, can be used to report information about the crop feed rate system 502 to a local network 540 and CAN bus 542. The information can comprise any type of information concerning the crop feed rate control system 502 such as, but not limited to, component data and/or crop processing data, identification of the controlling component, operating settings/parameters (e.g., operator inputs, measured vehicle speed, PID and slew rate parameters), and current harvesting rate (e.g., ground speed).

Figure 6:
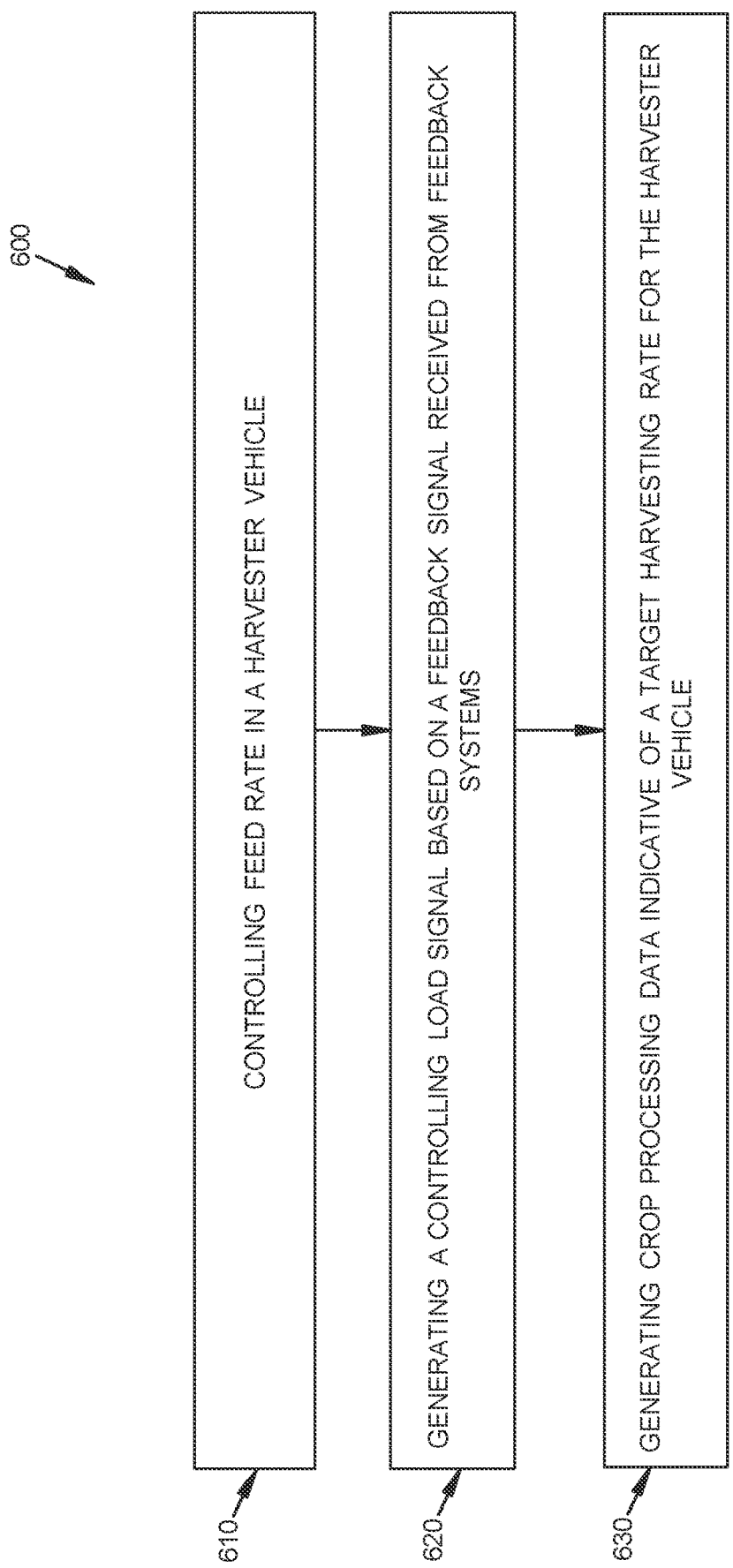
FIG. 6 is a flow diagram illustrating one implementation of a method for controlling feed rate in a harvester vehicle in accordance with this disclosure.

FIG. 6 is a flow diagram illustrating one implementation of a method 600 for controlling feed rate in a harvester vehicle (e.g., 100, 200 in FIGS. 1, 2). The harvester vehicle can comprise a crop processing system comprising two or more crop processing components that operably process a harvested crop and a vehicle control system to control a feed rate of the harvester vehicle by controlling the harvester vehicle speed.

At 610, the method comprises controlling the feed rate in the harvester vehicle by operably providing crop processing data to the vehicle control system, the crop processing data used by the vehicle control system to operably control the rate of harvesting for the crop harvesting device.

At 620, the controlling comprises generating a controlling load signal based at least upon a feedback signal received from one or more feedback systems. The feedback signal can comprise data indicative of a detected load amount for the respective components of the crop processing system and indicative of a target load amount for the respective components of the crop processing system. The controlling load signal can be indicative of a controlling component of the two or more crop processing components of the crop processing system.

At 630, the controlling comprises generating the crop processing data indicative of a target harvesting rate for the vehicle that is different than the harvesting rate based at least upon the target load signal and controlling load signal.

In some implementations of the method, the crop processing components that operably process a harvested crop comprise two or more of: a crop accumulator component that operably, temporarily stores the harvested crop, the crop accumulator component comprising an accumulator capacity monitor; a crop header component that operably harvests the crop from a target field, the crop header component comprising a header and a header system load monitor; a crop conveyor component that conveys the crop through the vehicle, the crop conveyor component comprising one or more air ducts and an air system load monitor; a crop cleaner component that operably cleans the harvested crop, the crop cleaner component comprising a cleaner system load monitor; and a map based farming (MBF) component that operably guides movement of the vehicle during harvesting, the MBF component comprising an MBF system monitor.

In some implementations of the method, the first control module determines the controlling component based at least upon the detected load amount and the target load amount. In some of these implementations, the controlling component is indicated by the component having a greater detected load to target load ratio.

Harvester vehicles, in particular a cotton stripper or a cotton picker, have a defined capacity that is a function of ground speed and yield. Generally, for a given crop yield, the harvester vehicle is set to operate as close to capacity as possible (e.g., at the optimal harvesting rate) to maximize productivity (e.g., crop output). This can be accomplished, for example, by setting the targeted load (%) at or near 100%. But, in other instances, it may be desirable to run the harvester vehicle at less than full capacity, for example by setting the targeted load (%) to 70% rather than 100%, to accomplish different harvesting objectives. As an example, the targeted load (%) can be set at less than maximum capacity for reasons such as, but not limited to, maximizing cotton quality and/or minimizing cotton loss. Therefore, the feed rate control system disclosed herein is not limited to implementations that maximize throughput/productivity, but rather can also be implemented to optimize cotton quality and/or minimize cotton loss.

The feed rate control system disclosed herein is configured to control the harvesting rate of a harvester vehicle (e.g., ground speed) by optimizing the relationship between the controlling load and targeted load to determine a target harvesting rate (e.g., optimal vehicle speed) based on field conditions and mass flow rate. In this manner, the feed rate control system of the present disclosure can maximize throughput by maximizing utilization of the available capacity in the harvester vehicle (e.g., by taking into account field conditions and mass flow), while mitigating plugs or blockages within the harvester vehicle. Accordingly, the feed rate control system disclosed herein improves productivity and keeps harvesting costs low.

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A harvester vehicle comprising:
a crop processing system comprising two or more crop processing components that operably process a harvested crop;
a vehicle control system that operably controls a harvesting rate of the vehicle; and
a crop feed rate control system that operably provides crop processing data to the vehicle control system, the crop feed rate control system comprising:
one or more feedback systems that operably provide a feedback signal comprising data indicative of a detected load amount for the respective components of the crop processing system and indicative of a target load amount for one or more of the respective components of the crop processing system;
a first control module that operably receives the feedback signal and generates a controlling load signal based at least upon the feedback signal, the controlling load signal being indicative of a controlling crop processing component of the two or more crop processing components of the crop processing system determined to have a limiting effect on the harvesting rate of the vehicle greater than limiting effects on the harvesting rate of the crop processing components other than the controlling crop processing component; and
a second control module that operably receives a targeted load signal and the controlling load signal, the second control module operably generating the crop processing data indicative of a target harvesting rate for the vehicle that is different than the harvesting rate.

2. The harvester vehicle of claim 1, the crop processing data used by the vehicle control system to control the harvesting rate by adjusting ground speed of the harvester.

3. The harvester vehicle of claim 2, the first control module comprising a core system control module that determines the controlling crop processing component based at least upon the detected load amount and the target load as the crop processing component having a detected load to target load ratio greater than detected load to target load ratios of the crop processing components other than the controlling crop processing component.

4. The harvester vehicle of claim 1, the crop feed rate control system comprising a fault monitor that sets the target load amount to zero when a speed sensor indicates a fault, resulting in a reduction of the harvesting rate.

5. The harvester vehicle of claim 1, the second control module comprising a proportional integrative derivative (PID) and slew rate controller, the PID and slew rate controller using predetermined parameters to identify the target harvesting rate for the vehicle based at least on a difference between the controlling load and the target load for the controlling component, and determining a rate of change from the harvesting rate to the target harvesting rate of the vehicle based at least upon harvesting conditions.

6. The harvester vehicle of claim 5, the second control module receiving one or more of the following, to be used by the PID and slew rate controller to identify the target harvesting rate and the rate of change from the harvesting rate to the target harvesting rate:
an operably measured harvester vehicle speed;
one or more predetermined PID parameters;
one or more operator inputs; and
one or more predetermined slew rate parameters.

7. The harvester vehicle of claim 1, the two or more crop processing components comprising at least two of:
a crop accumulator component that operably, temporarily stores the harvested crop, the crop accumulator component comprising an accumulator capacity monitor;
a crop header component that operably harvests the crop from a target field, the crop header component comprising a header and a header system load monitor;
a crop conveyor component that conveys the crop through the vehicle, the crop conveyor component comprising one or more air ducts and an air system load monitor;
a crop cleaner component that operably cleans the harvested crop, the crop cleaner component comprising a cleaner system load monitor;
a propulsion component that operably produces motion of the harvester vehicle, the propulsion component comprising at least one propulsion circuit, a propulsion device, and a propulsion system load monitor; and
a map based farming (MBF) component that operably guides movement of the vehicle during harvesting, the MBF component comprising an MBF system monitor.

8. The harvester vehicle of claim 7, wherein the accumulator capacity monitor operably receives an accumulator level signal indicative of a detected fill level in the accumulator and a mass flow rate signal indicative of a detected mass flow of the crop in the accumulator, and generates an accumulator feedback signal comprising data indicative of the targeted load amount for the accumulator component.

9. The harvester vehicle of claim 7, further comprising a status monitoring component comprising a status monitor that operably receives a detected component load signal from respective components of the crop processing system and generates a feedback signal based at least on a load capacity of the respective components and the detected component load, the feedback signal comprising data indicative of the detected load amount for the respective components of the crop processing system.

10. The harvester vehicle of claim 9, the status monitoring component updates a load capacity of the respective components of the crop processing system during operation, based at least on active calibration of an empty load condition.

11. The harvester vehicle of claim 7, wherein the header system load monitor operably receives an in-operation header load signal indicative of a detected load at the header, and generates a load capacity feedback signal comprising data indicative of the detected load amount for the header component from one or more of:
detected pressure at a header pressure pump;
detected current through control valves of the pump in the header system; and
a detected shaft rotation speed in the header.

12. The harvester vehicle of claim 7, wherein the air system load monitor operably receives an air flow signal indicative of air flow in the one or more ducts, and generates a load capacity feedback signal comprising data indicative of the detected load amount for the air flow through the air ducts.

13. The harvester vehicle of claim 7, wherein the cleaner system load monitor operably receives a detected cleaner load signal and generates a detected load amount feedback signal comprising data indicative of one or more of:
a detected pressure at a pump in the cleaner system;
a detected current through control valves of the pump in the cleaner system; and
a detected shaft rotation speed.

14. The harvester vehicle of claim 7, wherein the MBF system monitor operably receives a MBF signal indicative of a detected MBF load and generates a load capacity feedback signal comprising data indicative of a detected MBF load amount of capacity speed, based at least upon imaging that correlates a crop to a projected yield.

15. The harvester vehicle of claim 9, wherein the status monitoring component further comprises an accumulator overfull monitor that operably receives a mass flow sensor response signal and generates a feedback signal comprising data indicative of a detected overfill condition in the accumulator of the crop processing system, resulting in the status monitor indicating a fault that reduces the harvesting rate.

16. A method for controlling feed rate in a harvester vehicle having a crop processing system comprising two or more crop processing components that operably process a harvested crop and a vehicle control system to control a feed rate of the harvester vehicle by controlling the harvester vehicle speed, the method comprising:
controlling the feed rate in the harvester vehicle by operably providing crop processing data to the vehicle control system, the crop processing data used by the vehicle control system to operably control the rate of harvesting for the crop harvesting device, the controlling comprising:
generating a controlling load signal based at least upon a feedback signal received from one or more feedback systems, the feedback signal comprising data indicative of a detected load amount for the respective components of the crop processing system and indicative of a target load amount for the respective components of the crop processing system, the controlling load signal being indicative of a controlling crop processing component of the two or more crop processing components of the crop processing system determined to have a limiting effect on the harvesting rate of the vehicle greater than limiting effects on the harvesting rate of the crop processing components other than the controlling crop processing component; and
generating the crop processing data indicative of a target harvesting rate for the vehicle that is different than the harvesting rate based at least upon a targeted load signal and controlling load signal.

17. The method of claim 16, wherein the crop processing components that operably process a harvested crop comprise two or more of:
a crop accumulator component that operably, temporarily stores the harvested crop, the crop accumulator component comprising an accumulator capacity monitor;
a crop header component that operably harvests the crop from a target field, the crop header component comprising a header and a header system load monitor;
a crop conveyor component that conveys the crop through the vehicle, the crop conveyor component comprising one or more air ducts and an air system load monitor;
a crop cleaner component that operably cleans the harvested crop, the crop cleaner component comprising a cleaner system load monitor; and
a map based farming (MBF) component that operably guides movement of the vehicle during harvesting, the MBF component comprising an MBF system monitor.

18. The method claim 16, further comprising determining the controlling component based at least upon the detected load amount and the target load amount.

19. The method of claim 18, further comprising determining the controlling crop processing component as the crop processing component that has a detected load to target load ratio greater than detected load to target load ratios of the crop processing components other than the controlling crop processing component.

20. A system for controlling a rate of harvesting of a vehicle harvester, the system comprising:
a crop processing system comprising two or more for the following crop processing components:
a crop accumulator component that temporarily stores the harvested crop;
a crop header component that operably harvests the crop from a target field;
a crop conveyor component that conveys the crop through the vehicle;
a crop cleaner component that operably cleans the harvested crop;
a propulsion component that operably produces motion of the vehicle harvester; and
a map based farming (MBF) component that guides movement of the vehicle;
a vehicle control system that operably controls a harvesting rate of the vehicle by controlling a speed of the vehicle; and
a crop feed rate control system that operably provides crop processing data to the vehicle control system, the crop processing data used by the vehicle control system to control the harvesting rate, the crop feed rate control system comprising:
one or more feedback systems that operably provide a feedback signal comprising data indicative of a detected load amount for the respective components of the crop processing system and indicative of a target load amount for the respective components of the crop processing system;
a first control module that operably receives the feedback signal and generates a controlling load signal based at least upon the detected load amount and the target load amount of the feedback signal, the controlling load signal indicative of a controlling component of the two or more crop processing components indicated by the component that has a greater detected load to target load ratio; and
a second control module that operably receives a targeted load signal and the controlling load signal, the second control module operably generating the crop processing data indicative of a target harvesting rate for the vehicle that is different than the harvesting rate, the second control module comprising a closed loop feedback controller that determines a rate of change from the harvesting rate to the target harvesting rate of the vehicle based at least upon harvesting conditions.

* * * * *